(12) United States Patent  (10) Patent No.: US 8,511,220 B2
Garcia et al.  (45) Date of Patent: Aug. 20, 2013

(54) CLEANING CYCLE INDICATOR AND CLEANING PROCESS FOR BEVERAGE MAKER

(75) Inventors: Jorge B. Garcia, Rogers, AR (US); Charles Brian Gross, Greeley, CO (US)

(73) Assignee: Wal-Mart Stores, Inc., Bentonville, AR (US)

( * ) Notice: Subject to any disclaimer, the term of this patent is extended or adjusted under 35 U.S.C. 154(b) by 995 days.

(21) Appl. No.: 12/403,015

(22) Filed: Mar. 12, 2009

(65) Prior Publication Data

US 2010/0229729 A1  Sep. 16, 2010

(51) Int. Cl.
  *A47J 31/40*  (2006.01)
(52) U.S. Cl.
  USPC .......................................................... 99/280
(58) Field of Classification Search
  USPC ................... 99/280, 281, 286, 297; 426/231
  See application file for complete search history.

(56) References Cited

U.S. PATENT DOCUMENTS

| | | | | |
|---|---|---|---|---|
| 3,390,626 A | | 7/1968 | Holstein et al. | |
| 3,589,271 A | * | 6/1971 | Tarrant et al. | 99/280 |
| 4,872,402 A | * | 10/1989 | Johnson et al. | 99/280 |
| 5,063,836 A | * | 11/1991 | Patel | 99/281 |
| 5,200,221 A | * | 4/1993 | Knepler | 426/231 |
| 5,375,508 A | * | 12/1994 | Knepler et al. | 99/280 |
| 5,511,465 A | * | 4/1996 | Friedrich et al. | 99/286 |
| 5,704,275 A | * | 1/1998 | Warne | 99/281 |
| 5,862,738 A | * | 1/1999 | Warne | 99/281 |
| 6,634,279 B2 | | 10/2003 | D'Antonio et al. | |
| 7,163,126 B2 | * | 1/2007 | Knepler | 222/52 |
| 7,197,377 B2 | | 3/2007 | Knepler | |
| 7,270,050 B2 | * | 9/2007 | Glucksman et al. | 99/297 |
| 2008/0282897 A1 | | 11/2008 | Webster et al. | |

* cited by examiner

*Primary Examiner* — Alvin Hunter
(74) *Attorney, Agent, or Firm* — Baker & Hostetler, LLP

(57) ABSTRACT

Various embodiments are directed to a beverage maker. The beverage maker may include a brew system, an indicator to indicate at least one of a cleaning and a maintenance need of the beverage maker, and a control circuit. The brew system may include a reservoir to receive a liquid, a heater to heat the liquid, an expendable filter structured to filter impurities from the liquid for at least a predetermined number of brew cycles, and a container for receiving a beverage brewed from the filtered liquid. The control circuit may include a processor configured to receive a signal from at least one sensor indicative of an end of a brew cycle, increment a brew cycle counter by one count at the end of each brew cycle, and activate the indicator when a value of the brew cycle counter is equal to the predetermined number of brew cycles.

6 Claims, 19 Drawing Sheets

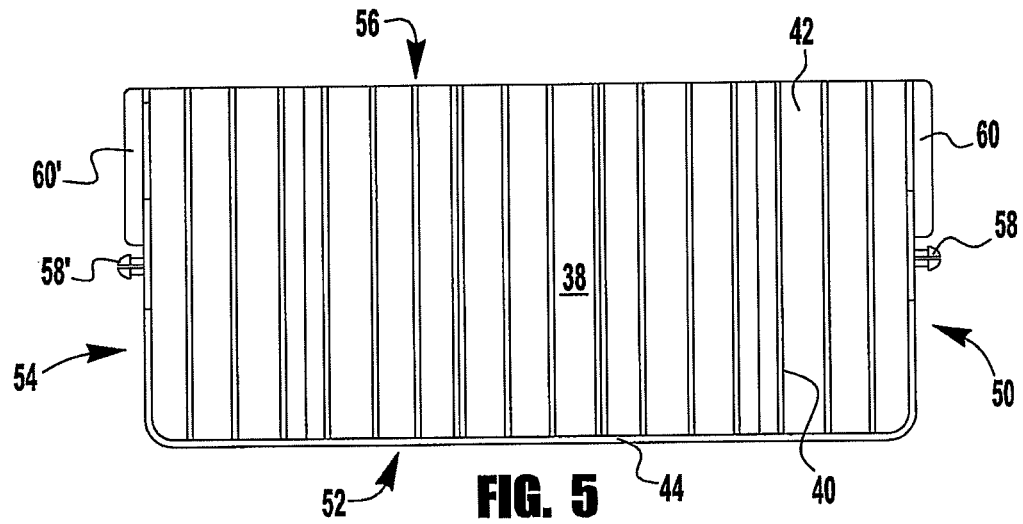
FIG. 5
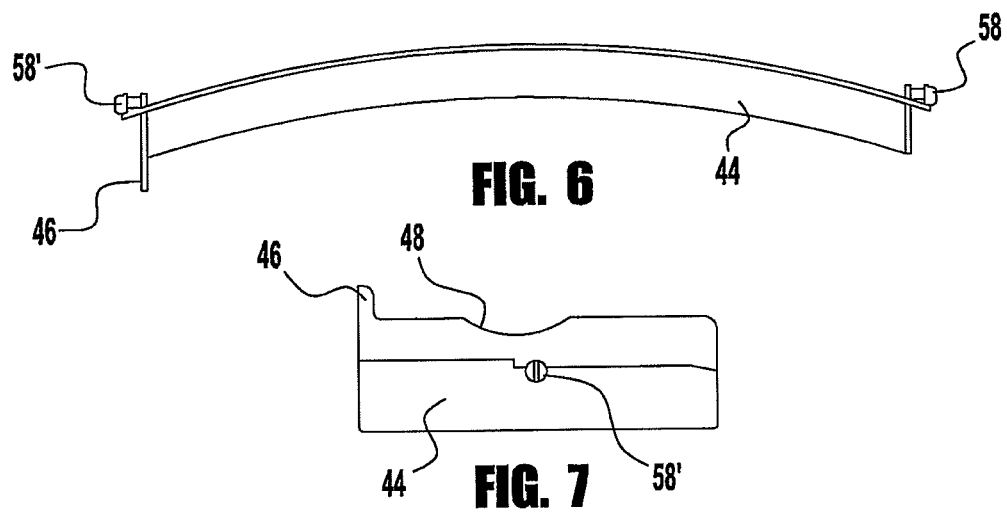
FIG. 6
FIG. 7
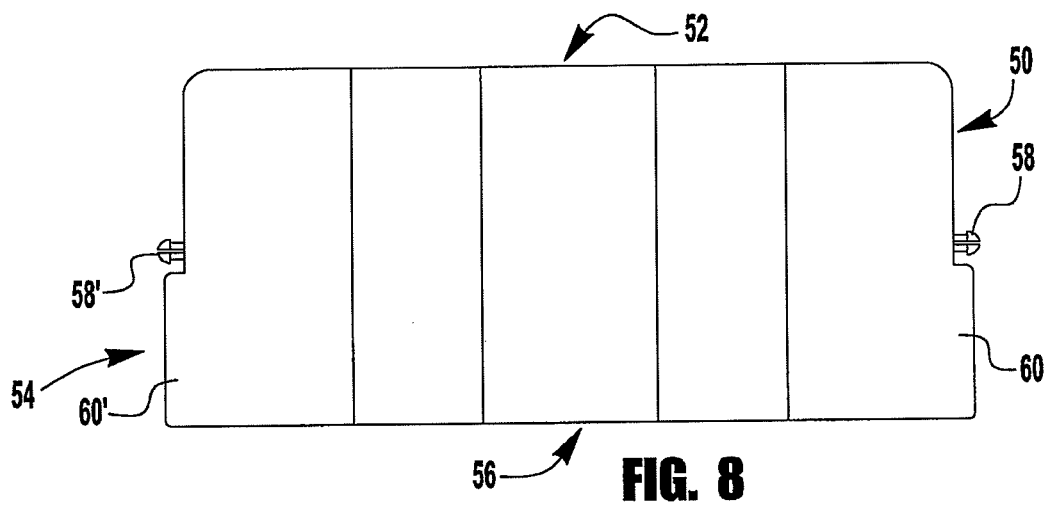
FIG. 8

CLEANING CYCLE INDICATOR AND CLEANING PROCESS FOR BEVERAGE MAKER

BACKGROUND

Beverage makers, such as coffee makers, tea makers, and/or cappuccino makers, for example, are commonly used in households, businesses, and/or restaurants. In various embodiments, a user can add a liquid, such as water, for example, to a reservoir of the beverage maker, and add coffee grounds, tea, and/or cappuccino mix, for example, to another portion of the beverage maker. In such an embodiment, the beverage maker can be configured to use the liquid to brew the beverage (e.g., coffee, tea, and/or cappuccino). Many beverage makers can also include a warming plate that can be used to keep the beverage warm after brewing.

BRIEF DESCRIPTION OF THE FIGURES

The above-mentioned and other features and advantages of this disclosure, and the manner of attaining them, will become more apparent and the disclosure itself will be better understood by reference to the following description of various embodiments of the disclosure taken in conjunction with the accompanying figures, wherein:

FIG. 5 is a top view of the liquid director of FIG. 4;

FIG. 6 is a front view of the liquid director of FIG. 4;

FIG. 7 is a side view of the liquid director of FIG. 4;

FIG. 8 is a bottom view of the liquid director of FIG. 4;

DETAILED DESCRIPTION

Figure 1:
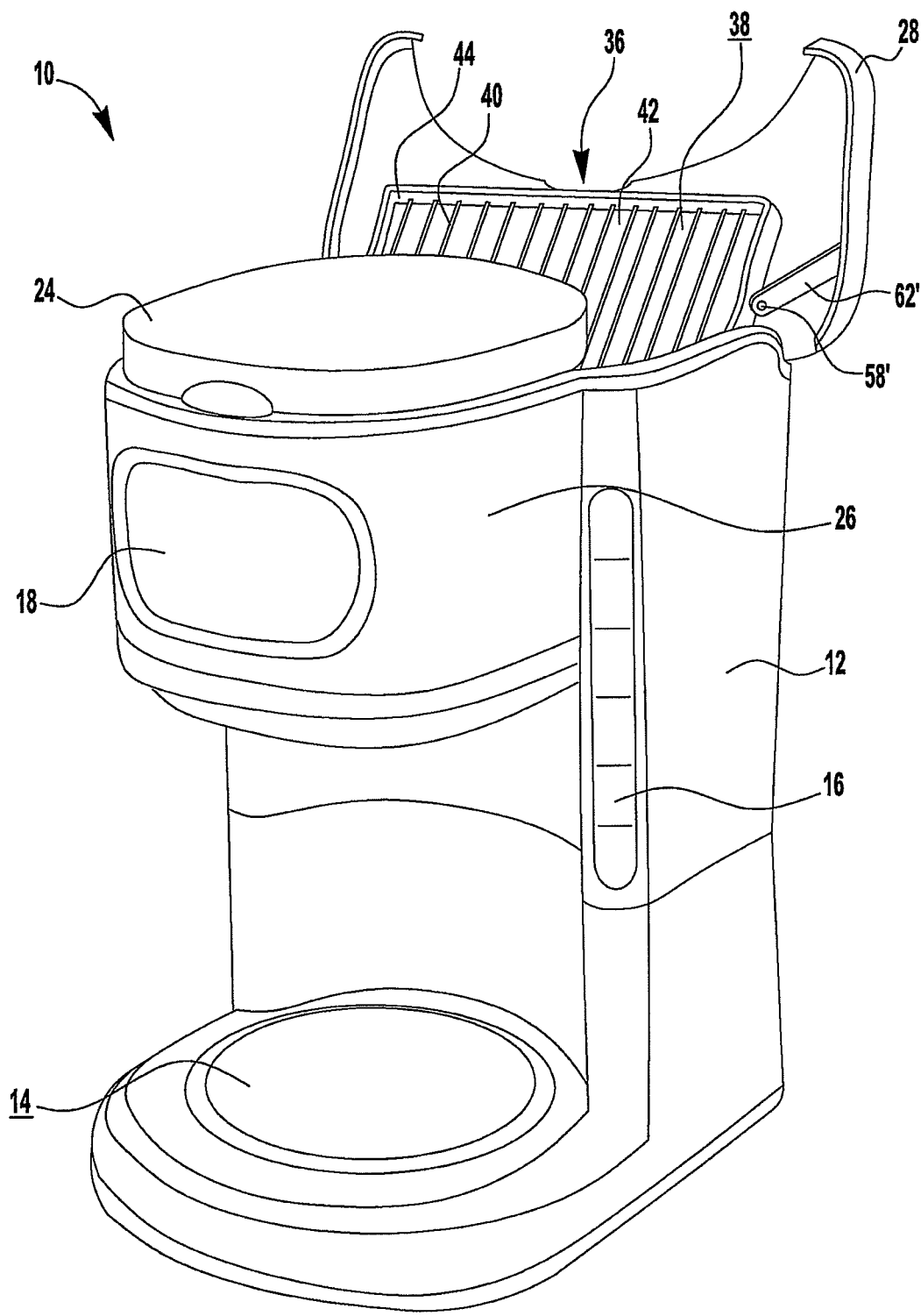
FIG. 1 is a perspective view of a beverage maker comprising a liquid director in a deployed position in accordance with one non-limiting embodiment.

Certain embodiments will now be described to provide an overall understanding of the principles of the structure, function, manufacture, and use of the apparatus and methods disclosed herein. One or more examples of these embodiments are illustrated in the accompanying figures. Those of ordinary skill in the art will understand that the devices and methods specifically described herein and illustrated in the accompanying figures are non-limiting example embodiments and that the scope of the various embodiments of the disclosure is defined solely by the claims. The features illustrated or described in connection with one example embodiment may be combined with the features of other embodiments. Such modifications and variations are intended to be included within the scope of the disclosure.

In one embodiment, the present disclosure generally relates to a liquid director configured to be used with a beverage maker, wherein the liquid director is configured to channel a liquid into a reservoir of the beverage maker. In at least one embodiment, the beverage maker can be used for consumer and small business applications, for example. In various embodiments, referring to FIGS. 1-3 and 11, a beverage maker 10 can comprise an outer shell 12, a heating surface 14, a liquid level indicator 16, a control panel 18, and a liquid carafe 20. In at least one embodiment, the heating surface 14 can be configured to heat, warm, and/or maintain the temperature of a brewed liquid, such as coffee, for example, within the liquid carafe 20, when the liquid carafe 20 is positioned on the heating surface 14. In various embodiments, the liquid level indicator 16 can be used to visually indicate to a user of the beverage maker 10 the level of the liquid within a container 22 or reservoir of the beverage maker 10, such that the user can determine about how much of a beverage will be made by the beverage maker 10. In at least one embodiment, the liquid level indicator 16 can comprise a transparent and/or semi-transparent portion, such that the user can view the level of the liquid within the container 22. In various embodiments, the control panel 18 can comprise an on/off switch, a timer, a clock, and/or various brewing cycle switches, for example. Those of skill in the art will recognize that the control panel 18 can comprise any other suitable switches, buttons, and/or indicators. In various embodiments, the beverage maker 10 can also comprise a nozzle 19 configured to drip, channel, and/or flow the brewed beverage into the liquid carafe 20. In at least one embodiment, the beverage maker 10 can comprise a coffee maker, a tea maker, a cappuccino maker, and/or any other suitable apparatus configured to brew or make a beverage, for example. Those of skill in the art will understand that the illustrated beverage maker 10 is merely one example embodiment and is not meant to limit the scope of the present disclosure.

In various embodiments, still referring to FIGS. 1-3 and 11, the beverage maker 10 can comprise a cover 24 for covering a receiving portion 26 configured to receive coffee grounds, tea, cappuccino mix, and/or any other suitable substance for brewing a beverage. In at least one embodiment, the cover 24 can be moved between an open position (not illustrated) and a closed position such that the user can place the coffee grounds, tea, cappuccino mix, and/or any other suitable substance, used for brewing, or drip-brewing, the beverage therein. In such an embodiment, the cover 24 can be pivotably attached to a portion of the beverage maker 10. In various embodiments, the beverage maker 10 can comprise a lid 28 configured to be positioned at least partially over an opening 30 in the outer shell 12. In at least one embodiment, the lid 28 can be movable between an open or a first position in which the opening 30 is at least partially uncovered by the lid 28 and a closed or a second position in which the opening 30 is at least partially covered by the lid 28. In such an embodiment, the lid 28 can be pivotably attached to a portion of the beverage maker 10. In various embodiments, the lid 28 can comprise any other suitable configuration configured to at least partially cover the opening 30.

Figure 3:
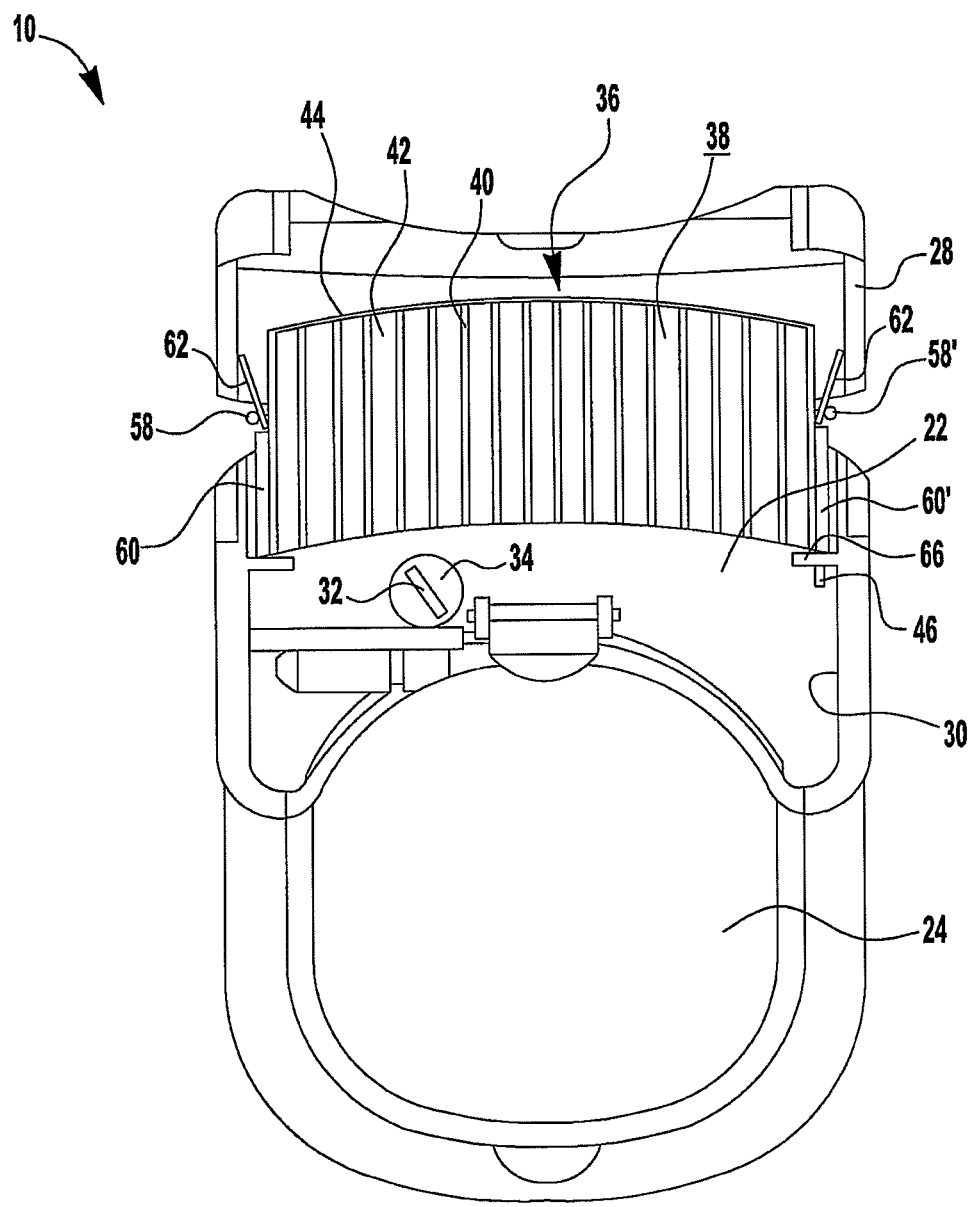
FIG. 3 is a top view of the beverage maker of FIG. 1.
Figure 22:
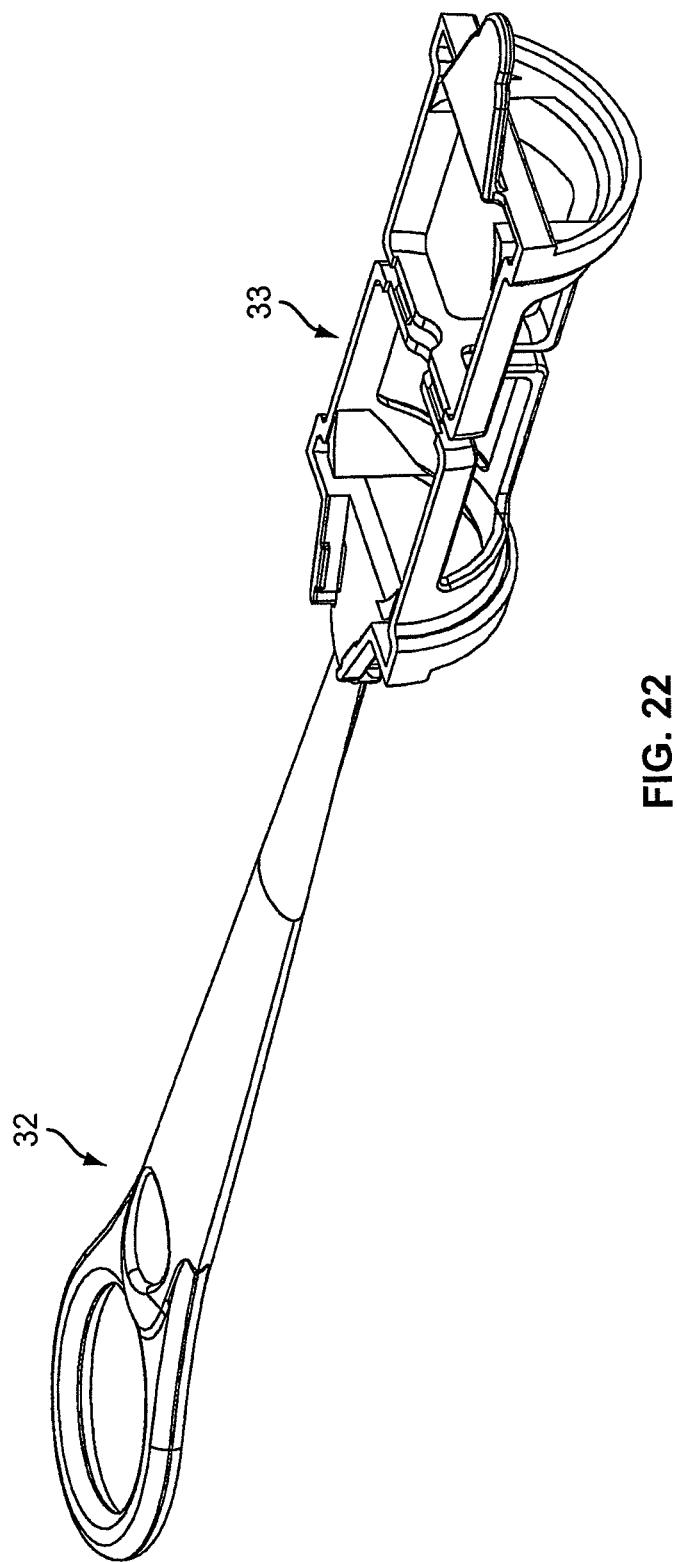
FIG. 22 is a perspective view of a filter dipstick without a filter therein.

In various embodiments, referring to FIGS. 3 and 22, the beverage maker 10 can comprise a filter dipstick 32 (FIG. 22) configured to comprise a filter 34 (not shown), such as a charcoal filter, for example, on an end thereof. In at least one embodiment, the filter dipstick 32 can comprise a filter cage 33 configured to receive the filter 34. In FIG. 22, the filter cage 33 is shown in an opened state and without the filter 34 received therein. In various embodiments, the filter 34 can be positioned via the filter dipstick 32 within a receiving aperture defined in the container 22. In such an embodiment, the beverage maker 10 can be configured to withdraw the liquid from the container 22 via the receiving aperture. In various embodiments, the filter 34 can be configured to filter impurities out of the liquid as the liquid is drawn though the receiving aperture and used to brew a beverage. In various embodiments, the filter dipstick 32 can easily be removed from and positioned within the receiving aperture of the container 22 by a user. Likewise, in at least one embodiment, the user can easily open the filter cage to replace the filter 34, after the filter's useful life has expired. In certain embodiments, the useful life of the filter 34 is specified by the number of brew cycles for which the filter is able to effectively filter impurities from the liquid. In one such embodiment, the amount of filter material (e.g., charcoal) contained within the filter 34 may be selected to provide effective filtration for a number of brew cycles dictated by the cleaning/maintenance requirements of the beverage maker 10. For example, if the beverage maker 10 requires cleaning/maintenance every 60 brew cycles, the amount of filter material may be selected to provide effective filtration for at least 60 brew cycles. In this way, the filter may be replaced concurrently with cleaning/maintenance activities.

Figure 2:
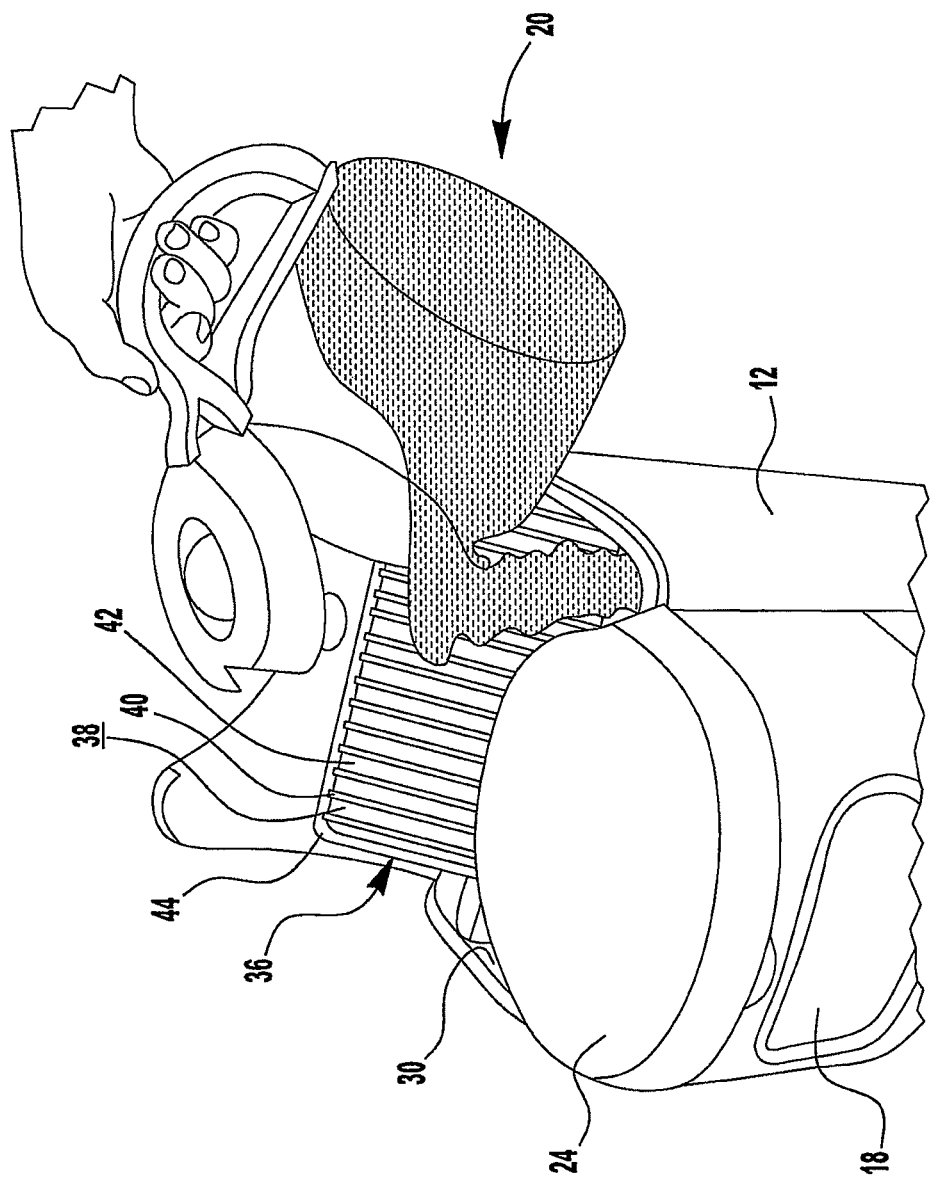
FIG. 2 is a partial perspective view of the beverage maker of FIG. 1, illustrating a liquid being poured onto the liquid director and being channeled into an opening of the beverage maker.

In various embodiments, referring to FIGS. 1-3, the beverage maker 10 can comprise a liquid director 36 configured to channel and/or direct a liquid through the opening 30 and into the container 22. In at least one embodiment, referring to FIG. 2, the liquid director 36 can be configured to inhibit, or at least minimize, liquid from splashing out of the opening 30 and/or being poured over the outer shell 12 of the beverage maker 10 onto an area surrounding the beverage maker 10. Further, as illustrated in FIG. 2, the liquid director 36 can reduce the chance of liquid spillage even when the opening 30 in the beverage maker 10 is quite small, owing the liquid director's configuration and position at least partially over a portion of the opening 30 and/or at least partially within the opening 30, for example. In various embodiments, the liquid director 36 can comprise any suitable shape, such as substantially rectangular, substantially square, substantially triangular, substantially oval, or any other suitable polygonal shape.

In various embodiments, referring to FIGS. 4-8, the liquid director 36 can comprise a surface 38 configured to receive a liquid poured from the liquid carafe 20, or other pitcher or device, for example, and channel the liquid into and through the opening 30 and to the container 22. In various embodiments, the surface 38 can be flat, concave, and/or arcuate, for example. In other various embodiments, the surface 38 can comprise a flat, a concave, and/or an arcuate portion. The surface 38 can be concave toward the lid when the liquid director 36 is in the deployed, fluid receiving position. In at least one embodiment, the liquid director 36 can comprise a first side 50, a top side 52, a second side 54, and a bottom side 56. In such an embodiment, the liquid can be directed into and through the opening 30 as the liquid is flowed toward and over the bottom side 56 of the liquid director 36.

Further to the above, still referring to FIGS. 4-8, the surface 38 can comprise at least one projection 40 extending outwardly therefrom, wherein the at least one projection 40 can be configured to enhance the surface's ability to channel and/or direct the liquid into and through the opening 30. In at least one embodiment, the at least one projection 40 can extend at least partially and/or completely between the top side 52 and the bottom side 56 of the liquid director 36, for example, such that the liquid can be directed or channeled toward the bottom side 56 when poured onto the liquid director 36. In such an embodiment, the at least one projection 40 can be perpendicular, or substantially perpendicular to the first side 50 and/or the second side 54, for example. In various embodiments, the at least one projection 40 can comprise any other suitable orientation on the liquid director 36 and can comprise any suitable cross-sectional shape, such as square, rectangular, triangular, arcuate, and/or flat, for example. In other various embodiments, the at least one projection 40 can comprise a plurality of projections or ridges positioned about an area of the surface 38 and at least partially extending between the top side 52 and the bottom side 56 of the liquid director 36. In such an embodiment, liquid channels 42 can be defined between the plurality of projections 40, wherein the liquid channels 42 can be configured to direct the liquid toward the bottom side 56 of the liquid director 36, through the opening 30, and into the container 22. In various embodiments, the liquid channels 42 can be recessed into the surface 38 to enhance the liquid directing ability of the liquid channels 42. In still other various embodiments, the at least one projection 40 can be eliminated and a plurality of grooves, passages, and/or recesses can be defined in the surface 38 of the liquid director 36. In various embodiments, the grooves, passages, and/or recesses can be configured to direct the liquid toward the bottom side 56 of the liquid director 36, through the opening 30, and into the container 22, much like the at least one projection 40 described above. In various embodiments, any other suitable members, grooves, passages, indents, and/or recesses configured to channel the liquid toward the bottom side 56 of the liquid director 36, through the opening 30, and into the container 22, can be used.

Further to the above, in various embodiments, a wall 44 can extend from the surface 38 and can at least partially surround a portion of the surface 38. In other various embodiments, the wall 44 can extend from the first side 50, the top side 52, and/or the second side 54 of the surface 38, for example. In at least one embodiment, the wall 44 can also extend from a portion of the bottom side 56, for example. In still other various embodiments, the wall 44 can be separated into one or more portions, each portion being positioned on a respective side of the surface 38, for example. In at least one embodiment, the wall 44 can aid the surface 38, the at least one projection 40, the liquid channels 42, the grooves, the passages, and/or the recesses in directing the liquid toward the bottom side 56 of the liquid director 36 and into the opening 30 by at least partially inhibiting or minimizing the liquid from running off of the first side 50, the second side 54, and/or the top side 52 of the liquid director 36.

Figure 4:
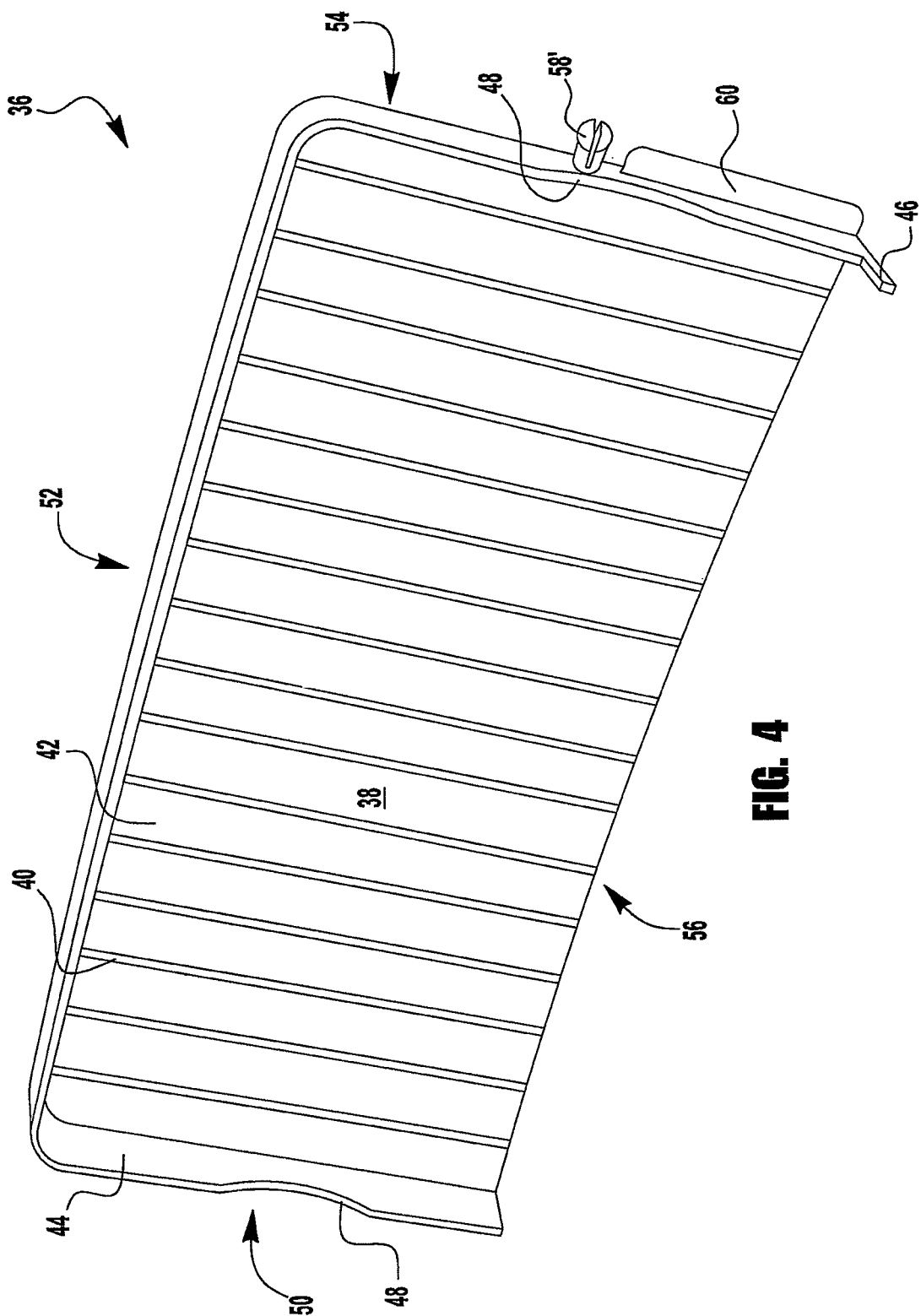
FIG. 4 is a perspective view of the liquid director of FIG. 1, in accordance with one non-limiting embodiment.
Figure 10:
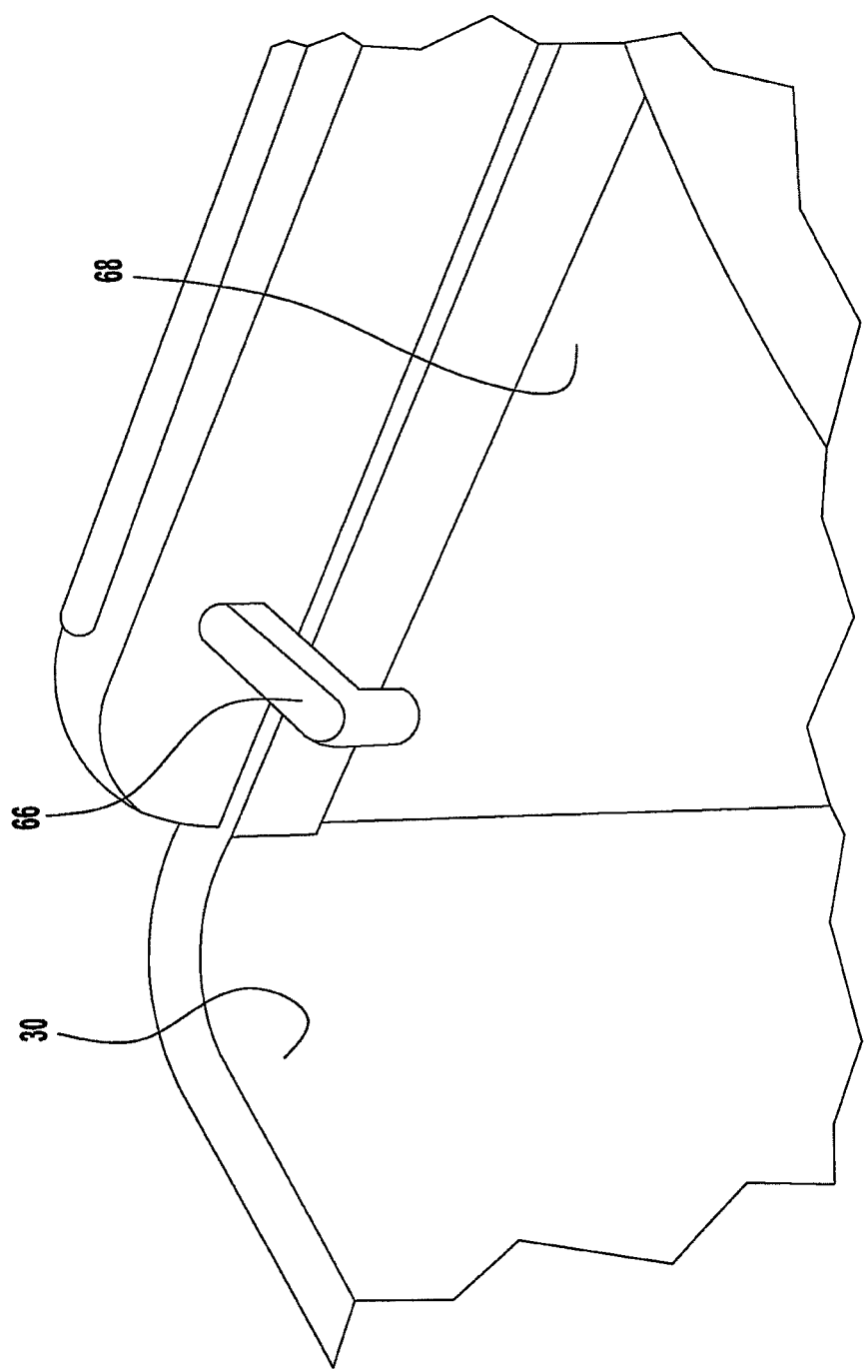
FIG. 10 is a perspective view of a portion of the opening of the beverage maker of FIG. 1, with the liquid director removed.
Figure 11:
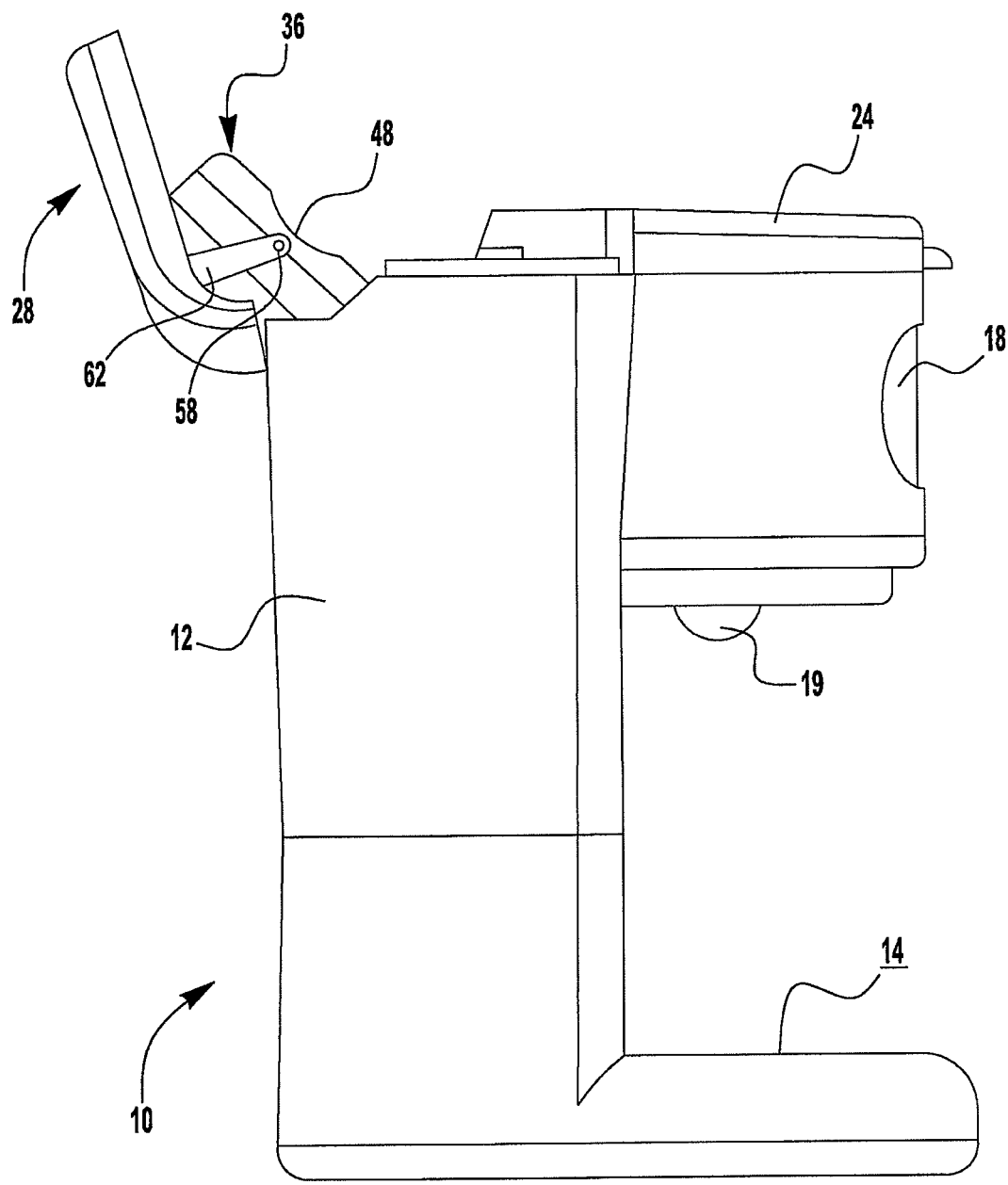
FIG. 11 is a side view of the beverage maker of FIG. 1.
Figure 12:
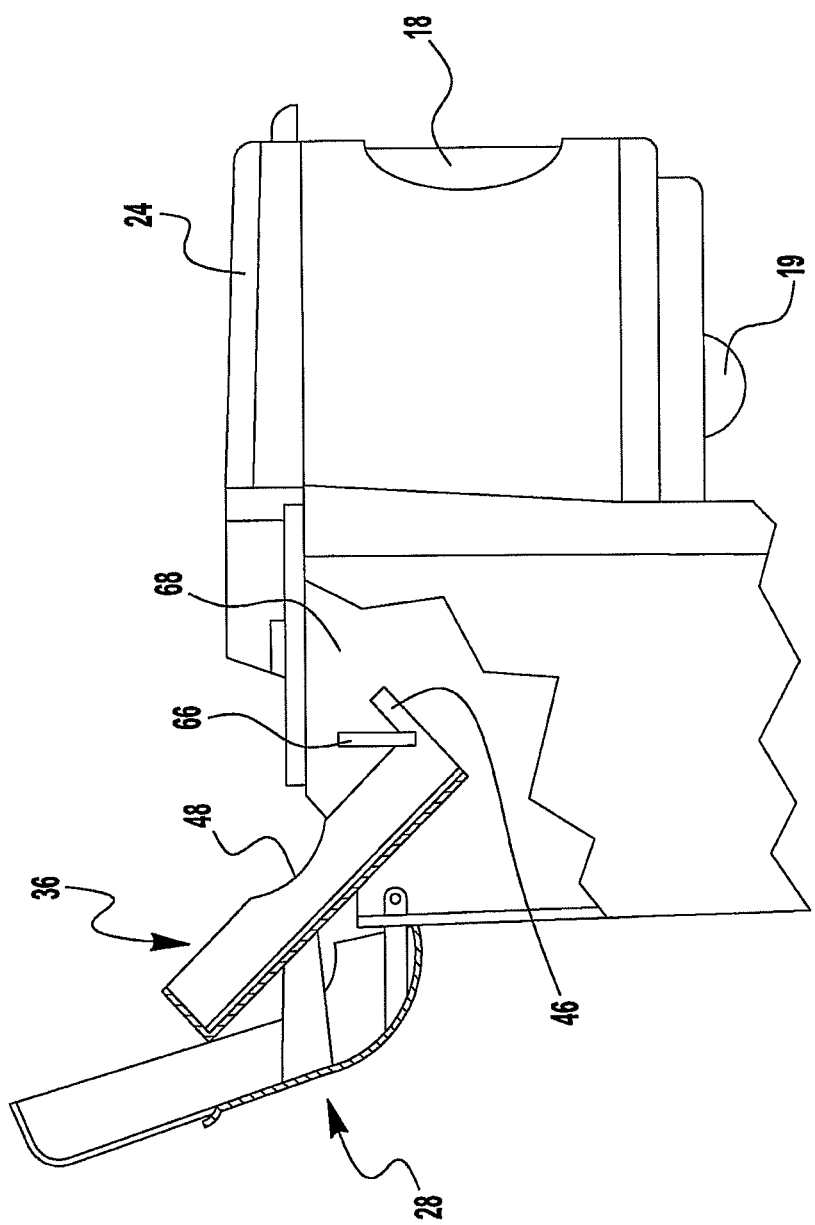
FIG. 12 is a partial cross-sectional side view of one embodiment of the liquid director and the lid of FIG. 1.

In various embodiments, referring to FIGS. 4, 7 and 10, at least one portion of the wall 44, such as the wall on the first side 50 and/or the second side 54, for example, can comprise an arcuate recess 48 defined therein. In at least one embodiment, the arcuate recess 48 can be configured to be engaged with a guide (see e.g., 66, FIG. 10) positioned on and/or extending from a side wall of the container 22. In various embodiments, the arcuate recess 48 can be slidably engaged with the guide to bias the liquid director 36 into a deployed, fluid receiving position when the liquid director 36 is moved from an undeployed position to the deployed position. In at least one embodiment, the arcuate recess 48 can be slidably engaged with the guide to bias the liquid director 36 into an undeployed, non-fluid receiving position when the liquid director 36 is moved from the deployed position into the undeployed position. In such an embodiment, the liquid director 36 can be fully positioned within the beverage maker 10 when in the undeployed position. In other various embodiments, the liquid director 36 can be made without the arcuate recess 48 and any other suitable type of biasing member can be used to move the liquid director 36 between the deployed and the undeployed positions. In other various embodiments, the biasing member can be eliminated and the liquid director can be moved between the deployed and the undeployed positions manually.

In various embodiments, referring to FIGS. 1, 3, 4-9, and 11, the liquid director 36 can comprise at least one connection member 58 extending from a portion thereof, such as the first side 50 or the second side 54, for example. In at least one embodiment, the at least one connection member 58 can be used to connect the liquid director 36 to the lid 28 and/or a side wall of the opening 30 or the container 22. In various embodiments, the at least one connection member 58 can comprise a first connection member 58 extending from the first side 50 and a second connection member 58' extending from the second side 54. In at least one embodiment, the first and second connection members 58 and 58' can extend from the wall 44, for example.

Further to the above, referring to FIGS. 3-6, and 8, the liquid director 36 can also comprise at least one fin 60 and at least one stop member 46 both extending from the first side 50, the second side 54, the bottom side 56, the wall 44 and/or another portion of the liquid director 36. In at least one embodiment, the fin 60 can be configured to be engaged with the guide (see e.g., 66, FIG. 10) on the side wall of the container 22 and/or a side wall of the opening 30. In at least one embodiment, the stop member 46 can be configured to retain the liquid director 36 in the deployed, fluid receiving position when engaged with the guide.

In various embodiments, referring to FIGS. 1 and 3-10, the at least one connection member 58 of the liquid director 36 can be attached to at least one arm 62 extending from the lid 28, for example. In at least one embodiment, referring to FIG. 9, the lid 28 can comprise two arms 62 and 62' extending therefrom, each arm comprising an aperture 64 and 64', respectively, at an end most distal from the lid 28. In various embodiments, the connection members 58 and 58' can be engaged with, press-fit into, and/or snap-fit into the apertures 64 and 64' in the arms 62 and 62', for example, to attach the liquid director 36 to the lid 28. In other various embodiments, a portion of the liquid director 36 can comprise an aperture (not illustrated) and the at least one arm can comprise the at least one connection member, for example, such that a connection of the liquid director 36 to the lid 28 can be made in a similar fashion as discussed above. In further various embodiments, any other suitable member(s) known to those skilled in the art can be used to attach the liquid director 36 to the beverage maker 10.

Figure 9:
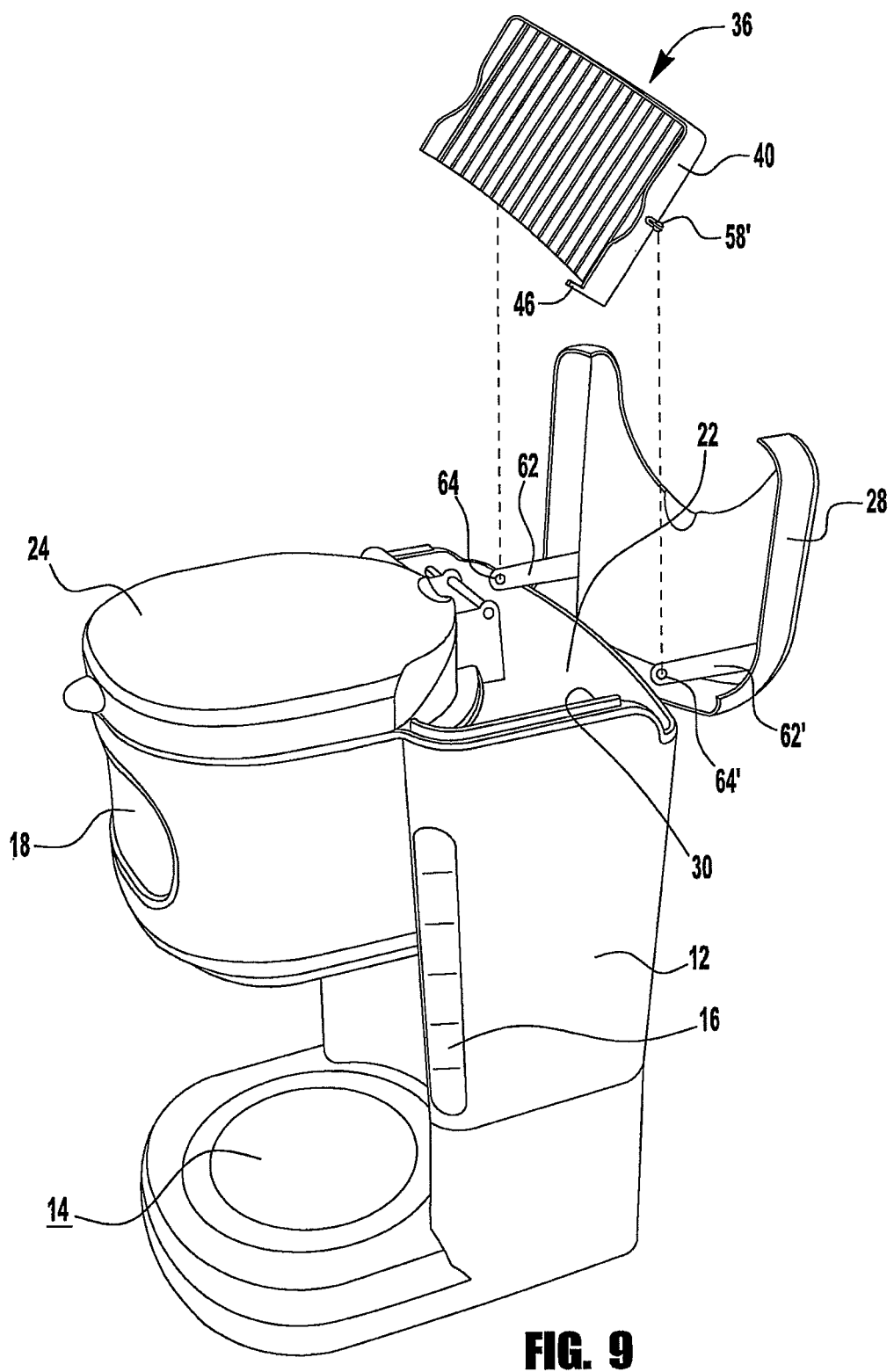
FIG. 9 is an exploded perspective view of FIG. 1, illustrating how the liquid director can be engaged with a lid of the beverage maker in accordance with one non-limiting embodiment.

In various embodiments, referring to FIGS. 9-10, a side wall 68 of the container 22 can comprise a guide 66, as referenced above, extending therefrom. In at least one embodiment, the arcuate recess 48 in the wall 44 can be slidably engaged with the guide 66 positioned on, attached to, formed with, and/or extending from the side wall 68 of the container 22, as the liquid director 36 is moved between the deployed position and the undeployed position, as discussed above. In at least one embodiment, the guide 66 can be generally "L" shaped and can have the bottom portion of the "L" shape facing downwardly toward a bottom portion of the container 22, for example. In other various embodiments, the guide 66 can comprise any other suitable position, orientation, shape, and/or configuration.

Figure 13:
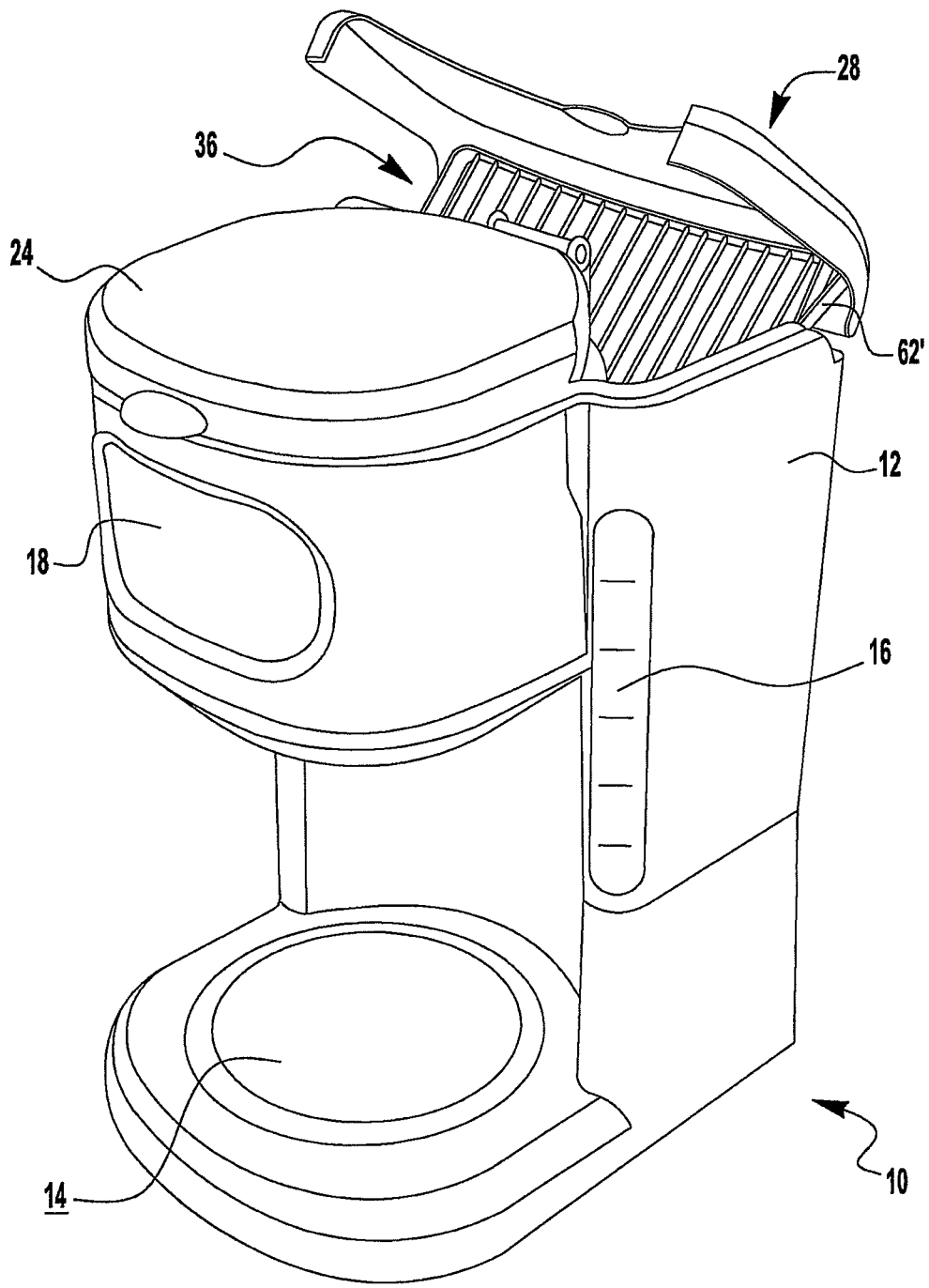
FIG. 13 is a perspective view of FIG. 1, illustrating the lid of the beverage maker in a partially closed position and the liquid director in a partially deployed position in accordance with one non-limiting embodiment.
Figure 14:
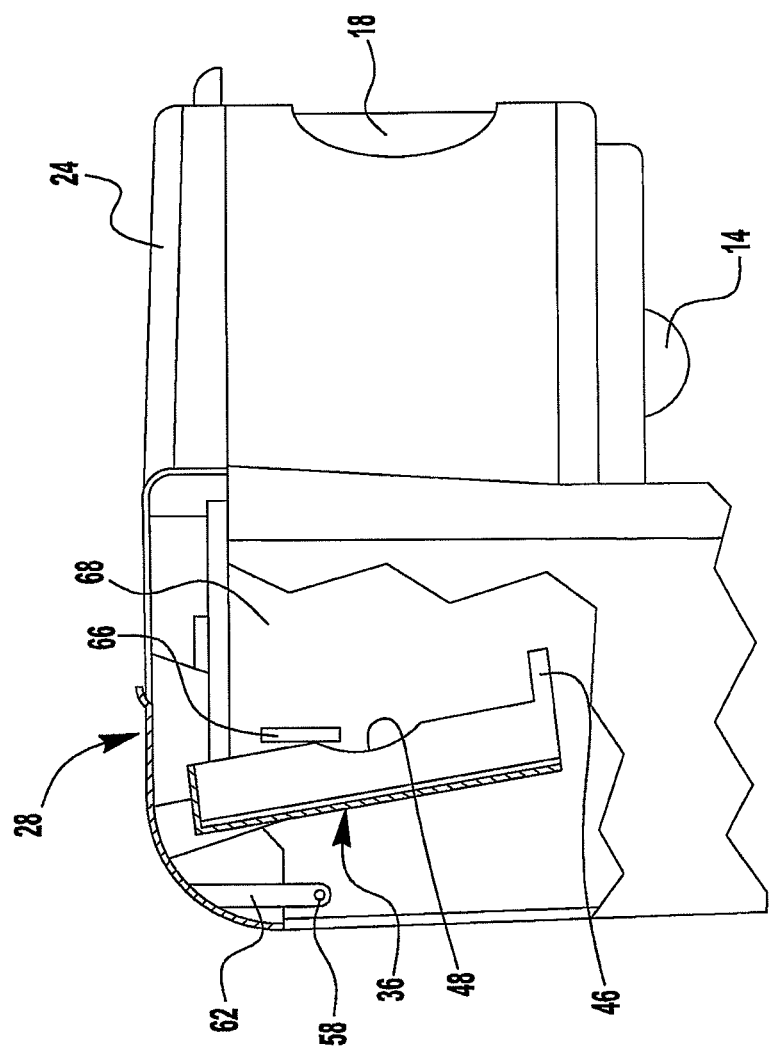
FIG. 14 is a partial cross-sectional side view of the beverage maker with the lid in a closed position and the liquid director in an undeployed position in accordance with one non-limiting embodiment.

In various embodiments, referring to FIGS. 11-14, the liquid director 36 can be moved between a deployed position, a partially deployed position or an intermediate position, and an undeployed position. In at least one embodiment, referring to FIG. 11, the liquid director 36 can at least partially extend from the opening 30 when in the deployed, fluid receiving position. In various embodiments, referring to FIG. 12, a cross-sectional view of the liquid director 36 in the deployed position is illustrated. In at least one embodiment, FIG. 12 displays the engagement of the at least one stop member 46 with the guide 66. In such an embodiment, the stop member's engagement with the guide 66 can inhibit the liquid director 36 from being extended past the deployed, fluid receiving position. In such a position, the liquid director 36 can be configured to receive the liquid and channel the liquid toward the bottom side 56 of the liquid director 36, through the opening 30, and into the container 22. In various embodiments, the liquid director 36 can be in the deployed, fluid receiving position when the lid 28 is in the first position and/or the open position. In such a position, the lid 28 can at least partially uncover the opening 30. In various embodiments, FIG. 13 illustrates the liquid director 36 in the partially deployed or intermediate position where the liquid director 36 can be at least partially positioned within the opening 30 and can be at least partially situated within the container 22. In various embodiments, FIG. 14 illustrates the liquid director 36 in the undeployed position. In the undeployed position, the liquid director 36 can be at least partially positioned through the opening 30 and can be situated within the opening 30 and at least partially within the container 22. In such an embodiment, the liquid director 36 can be in the undeployed position when the lid 28 is closed and/or in the second position such that the lid 28 can at least partially, or fully, cover the opening 30. In various embodiments, the liquid director 36 can be fully positioned within the opening 30 and the container 22 when in the undeployed position.

In various embodiments, the liquid director 36 can be sold as an attachment for an existing beverage maker. In such an embodiment, the liquid director 36 can comprise attachment features which can allow the liquid director 36 to be attached to a lid, a side wall of a container, and/or another portion of the beverage maker, for example. Those of ordinary skill in the art will recognize that these attachment features can comprise, but are not limited to glue, hooks, pins, clips, and/or hangers, for example. In other various embodiments, the liquid director 36 can be configured to be attached to a guide on the lid or a side wall of a container.

Figure 15:
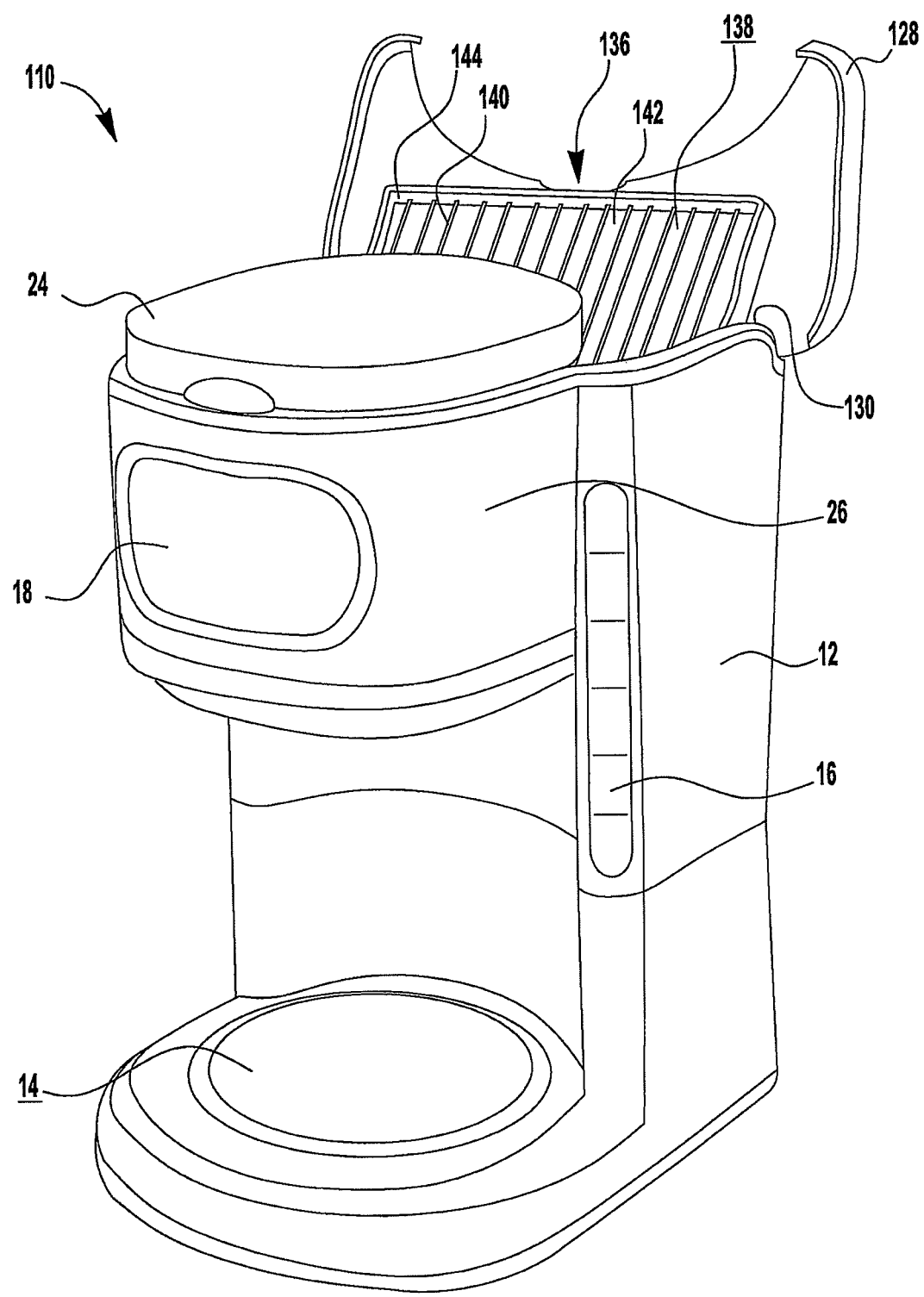
FIG. 15 is a perspective view of another beverage maker comprising a liquid director in a deployed position in accordance with one non-limiting embodiment.

In various embodiments, referring to FIG. 15, a beverage maker 110 can comprise a liquid director 136 formed separate from, and optionally not attached to, a lid 128. In such an embodiment, portions, such as side portions, for example, of the liquid director 136 can be attached, pivotably attached, and/or rotatably attached to portion of a side wall of an opening 130 in the beverage maker 110. As such the liquid director 136 can be pivoted, moved, and/or rotated with respect to the opening 130 between an undeployed, non-fluid receiving position and a deployed, fluid receiving position independent of movement of the lid 128. The deployed, fluid receiving position of the liquid director 136 is illustrated in FIG. 15. In various embodiments, the liquid director 136 can comprise similar features as the liquid director 36 described above, such as a side wall 144, a surface 138, at least one projection 140, and/or various liquid channels 142, for example. In such an embodiment, the liquid director 136 can be configured to channel a liquid into and through the opening 130 much like the liquid director 36 described above.

Figure 16:
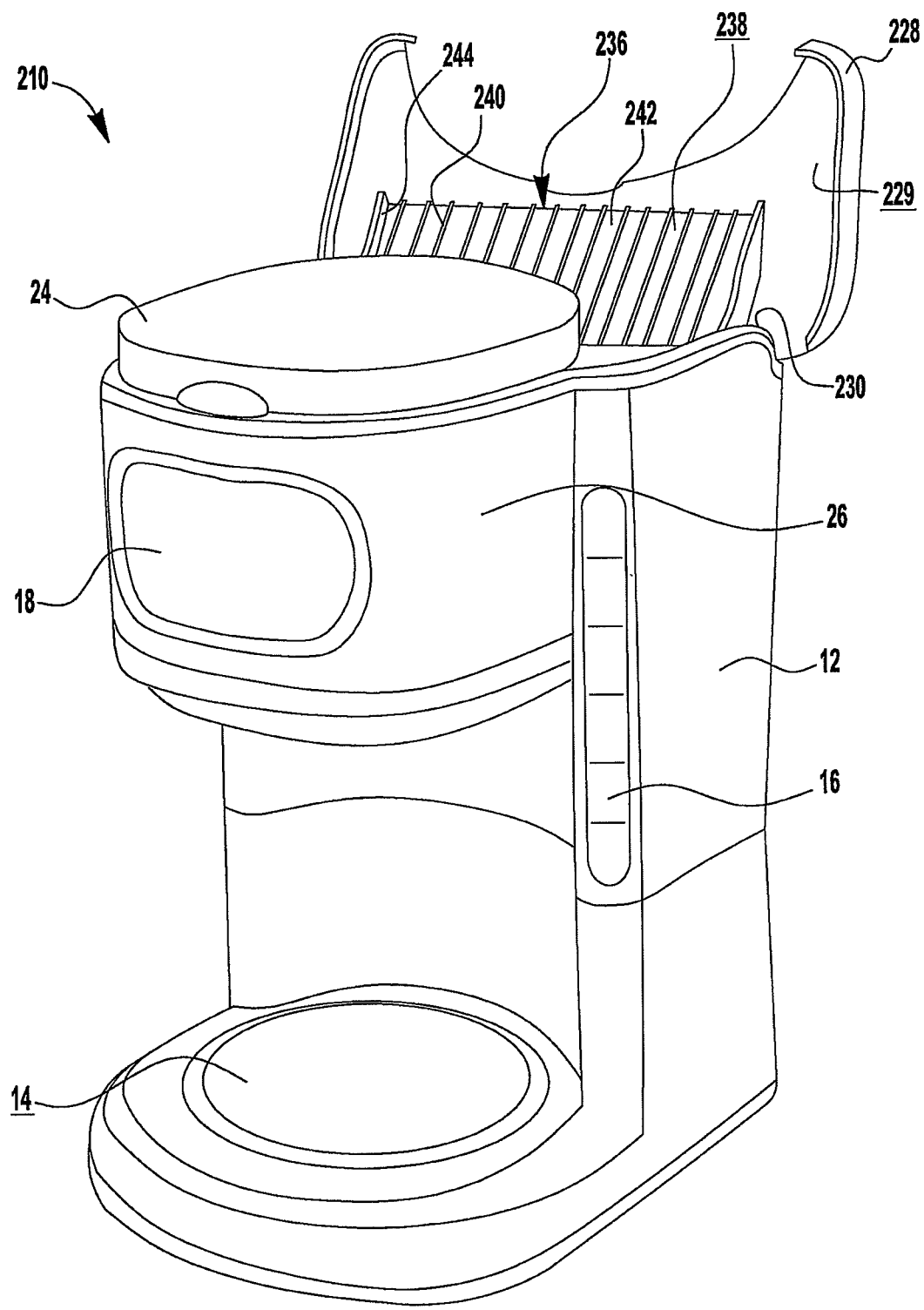
FIG. 16 is a perspective view of still another beverage maker comprising a liquid director in a deployed position in accordance with one non-limiting embodiment.

In other various embodiments, referring to FIG. 16, a beverage maker 210 can comprise a liquid director 236 formed integral with and/or attached to a portion of a lid 228 of the beverage maker 210, for example. In one embodiment, the liquid director 236 can be formed integral with and/or attached to a bottom surface 229 of the lid 228, for example. In various embodiments, the liquid director 236 can be glued to, melted to, screwed to, and/or otherwise attached to the bottom surface 229, for example. In various embodiments, the lid 228 and the liquid director 236 can be molded and/or formed as one piece by injection molding, for example. In at least one embodiment, the liquid director 236 can be in a deployed, fluid receiving position when the lid 228 is in an open and/or a first position and can be in an undeployed, non-fluid receiving position when the lid 228 is in a closed and/or a second position, for example. In at least one embodiment, the liquid director 236 can comprise similar features as that described above with respect to the liquid director 36, such as a surface 238, at least one projection 240, liquid channels 242, and/or a wall 244, for example. Similar to the above, in such an embodiment, the liquid director 236 can be configured to channel a liquid toward a lowermost portion thereof, through an opening 230 in the beverage maker 210, and into a container of the beverage maker 210.

A method of brewing a beverage using a beverage maker is provided. The beverage maker can comprise an outer shell comprising a reservoir configured to receive a liquid, an opening formed in the outer shell, wherein the opening is in fluid communication with the reservoir, and a liquid director positioned at least one of proximate to and partially overlapping with the opening. The method can comprise moving the liquid director from an undeployed, non-fluid receiving position to a deployed, fluid receiving position, pouring a liquid onto at least a portion of the deployed liquid director, and channeling the liquid into the opening using the liquid director. The beverage maker can also comprise a lid configured to at least partially cover the opening. The method can further comprise moving the lid into an open position such that the opening is at least partially exposed, wherein moving the lid moves the liquid director from the undeployed, non-fluid receiving position to the deployed, fluid receiving position.

Figure 17:
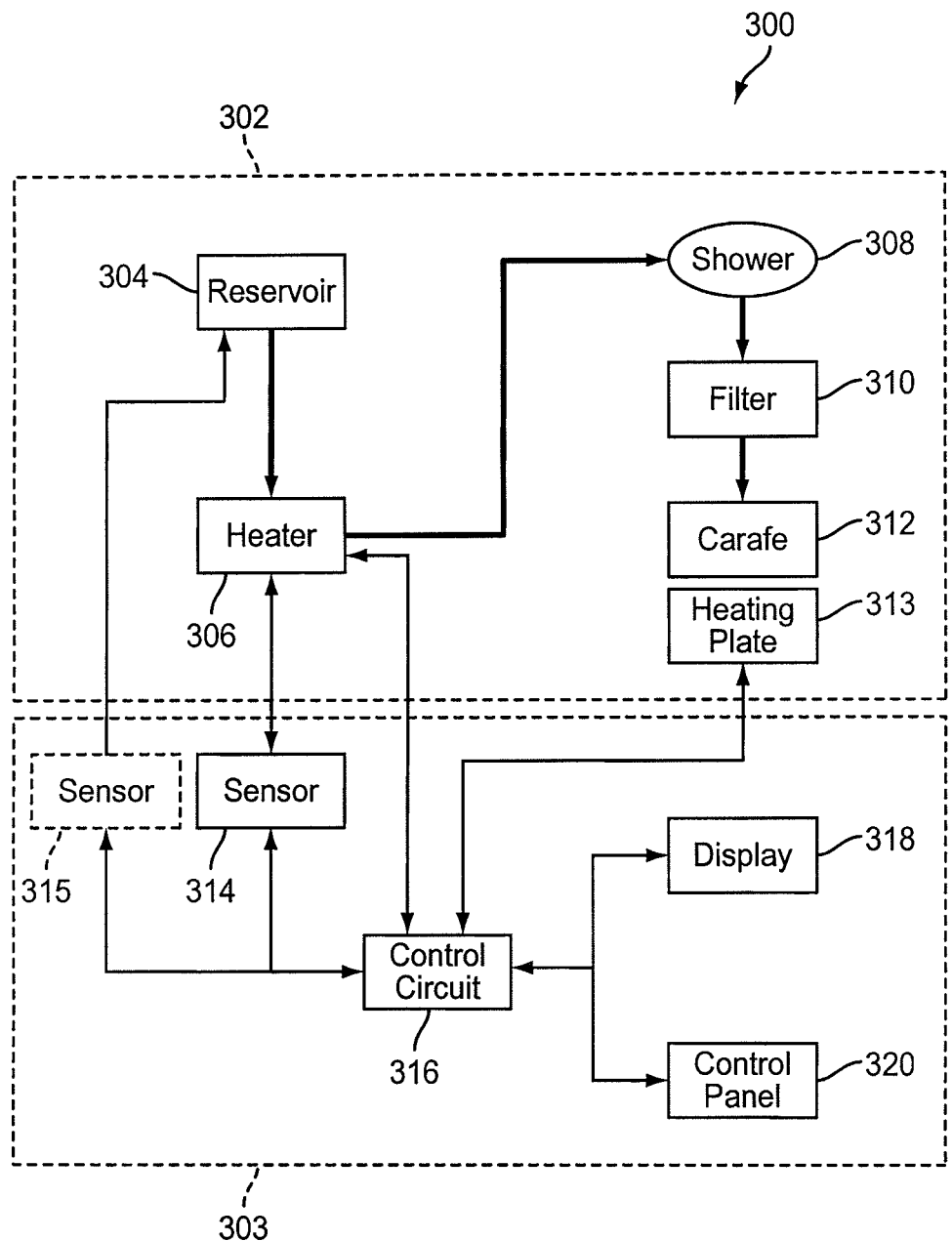
FIG. 17 illustrates a block diagram of a beverage maker in accordance with one non-limiting embodiment.

FIG. 17 illustrates a block diagram of a beverage maker 300 in accordance with one non-limiting embodiment. The beverage maker 300 may represent any suitable type of beverage maker having any suitable combination of external features, including, for example, those described above with respect to beverage makers 10, 110, and 210. As shown in FIG. 17, the beverage maker 300 comprises a brew system 302 and a control system 303. The brew system 302 may comprise a container or reservoir 304 for receiving water or another liquid to be brewed. Reservoir 304 may be in fluid communication with a heater 306. The reservoir 304 may be filled according to any suitable method including, for example, those described herein. When the reservoir 304 is filled, gravity may cause water from the reservoir 304 to flow through the heater 306. A shower 308 may be in fluid communication with the heater 306, but may be located above the heater 306 such that gravity prevents the water from reaching the shower 308.

When a brewing process is initiated, the heater 306 may heat up, causing water present at the heater 306 to boil. The force of the resulting steam may force water up to the shower 308. The shower 308 may direct hot water and steam towards a filter 310, which may include coffee grounds, tea, or any other substance for brewing with the water. Here, the water is transformed into the desired beverage. The beverage leaves the filter 310 and is directed to the carafe 312, where it is pooled until it is ready for drinking. A heating plate 313 may be provided to maintain the carafe 312, and accordingly the beverage, at a desired temperature.

The control system 303 may control various parts of the brewing process, and may provide additional features. For example, the control system 303 may detect the end of the brewing process. A control circuit 316 of the control system 303 may detect the end of the brewing process, for example, in conjunction with one or more sensors 314, 315. The control circuit 316 may be any suitable analog or digital circuit and may include, for example, a microcontroller, a microprocessor, any other suitable processing device for executing instructions stored on a computer-readable medium, or a field programmable gate array (FPGA). The control circuit 316 may be solid state and/or be made from solid state components. Sensors 314, 315 may be any suitable sensor type (e.g., based on the method used to detect the end of the brewing process).

Various methods may be used to determine the end of the brew process. For example, the control circuit 316 may determine the end of the brew process by monitoring a temperature of the heater 306, for example, via a heat sensor 314. During the brew process, when water is present in the heater 306, its temperature may approximate the temperature at which the water boils (e.g., 100° C. or 212° F. at sea level). When all of the water from the reservoir 304 is exhausted, then the heater 306 may also run dry, causing its temperature to exceed the boiling point. This may indicate the end of the brew process. The control circuit 316 of the system 303 may monitor a temperature of the heater 306 via a heat sensor 314 in communication with the heater 306. When the temperature of the heater 306 increases above the boiling point of water, the control circuit 316 may determine that a brew cycle has ended. Similar results may be obtained by measuring the temperature at other points of the brew system 302 including, for example, fluid lines leading to and/or from the heater. The temperature sensor 314 may be any suitable sensor capable of measuring temperature including, for example, a solid state sensor and/or a thermistor.

According to various embodiments, the control circuit 316 may determine the end of a brew cycle in other ways. For example, a sensor 315 may be positioned to sense the level of liquid in the reservoir 304. When the level of the liquid 304 in the reservoir drops below a predetermined level, it may indicate that all or a significant portion of the liquid from the reservoir has been brewed and, thus, the brew cycle is complete. In another embodiment, the control circuit 316 may be configured to measure a liquid level in the reservoir 304 at the start of a brew cycle. Based on this information, the control circuit 316 may estimate the end of the brew cycle, for example, using a timer. Because the duration of a brew cycle depends on the amount of liquid to be brewed, knowing the amount of liquid in the reservoir 304 at the beginning of the brew cycle may allow the control circuit 316 to estimate the duration of the brew cycle and determine the end of the brew cycle using a timer.

When the end of the brew cycle is detected, the control system 303 may take various actions including, for example, de-activating the heater 306. According to various embodiments, the control system 303 may also implement a time since brew timer. For example, when the control circuit 316 detects the end of the brew cycle, it may initiate a time since brew (TSB) timer. The end of the brew process may be detected via any suitable method including, for example, by monitoring the temperature of the heater 306 as described above. The TSB timer may be a software-based timer implemented by the control circuit 316 or a component thereof, or may utilize a discrete hardware component. The TSB timer may begin at zero and may count the time that passes after it is activated (e.g., at the end of a brew cycle). The current value of the TSB timer may be expressed in any suitable format including, for example, minutes, or hours plus minutes.

The state of the TSB timer may be provided to the user via the display 318. This may give the user an indication of how much time has passed since the end of the brew cycle and, accordingly, the age of the beverage in the carafe 312. The state of the TSB timer may be indicated in any suitable way. For example, a light may be illuminated to indicate when a predetermined time has passed since brewing. Also, in addition to or instead of the illumination of a light, an audible sound such as a beep may be generated when the predetermined time has elapsed. In some embodiment, the display 318 may be configured to display the current value of the TSB timer. For example, a control panel 320 may comprise a button or other input device that when actuated by the user, causes the control circuit 316 to display the current value of the timer at the display 318. According to various embodiments, the control circuit 316 may be further configured to deactivate the heating plate 313 when a predetermined interval (e.g., 2 hours) has passed since the end of the brew cycle. The predetermined interval may be measured by the TSB timer.

Figure 18:
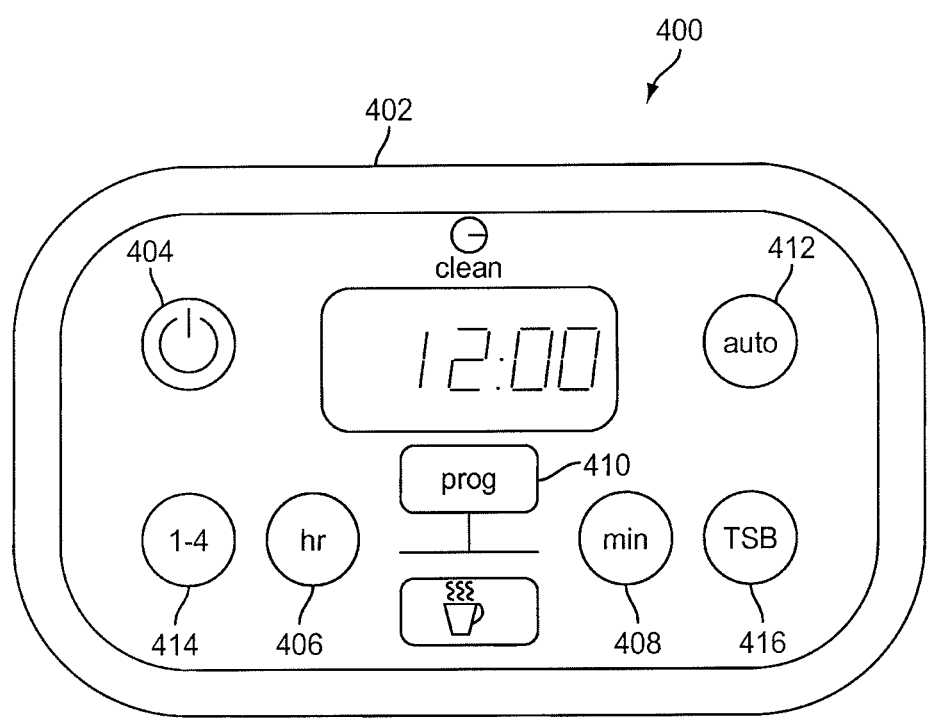
FIG. 18 illustrates an example of a panel of a beverage maker comprising a display.

FIG. 18 illustrates a panel 400 that, in various embodiments, may serve as both a display 318 and a control panel 320. The panel 400 may comprise a display 402, which may be an LCD, LED or other suitable display. The display 402 may be used to display the current value of the TSB timer, or may display the current time. An on/off button 404 may turn the beverage maker 300 on or off and may initiate the brewing process. The user may select a programmed or delayed brew by selecting program button 410 and entering a desired start time and/or delay time utilizing an hour button 406 and a minute button 408. An auto button 412 may be activated to initiate a programmed brew. The TSB 416 may be depressed by the user to cause the control circuit 316 to display the current state of the TSB timer on the display 402.

An alternate brew button 414 may allow a user to place the beverage maker 300 into an alternate brew mode. The alternate brew button 414 can be depressed by a user either before pressing the on/off button 404 or within a predetermined time. When in alternate brew mode, the control circuit 316 of the control system 303 may alternately turn the heater 306 on and off at a predetermined interval (e.g., every twenty-five seconds). This may allow the liquid to linger longer at the filter 310 and remain in contact with the grounds longer which may, in turn, lead to a stronger brew.

Figure 19:
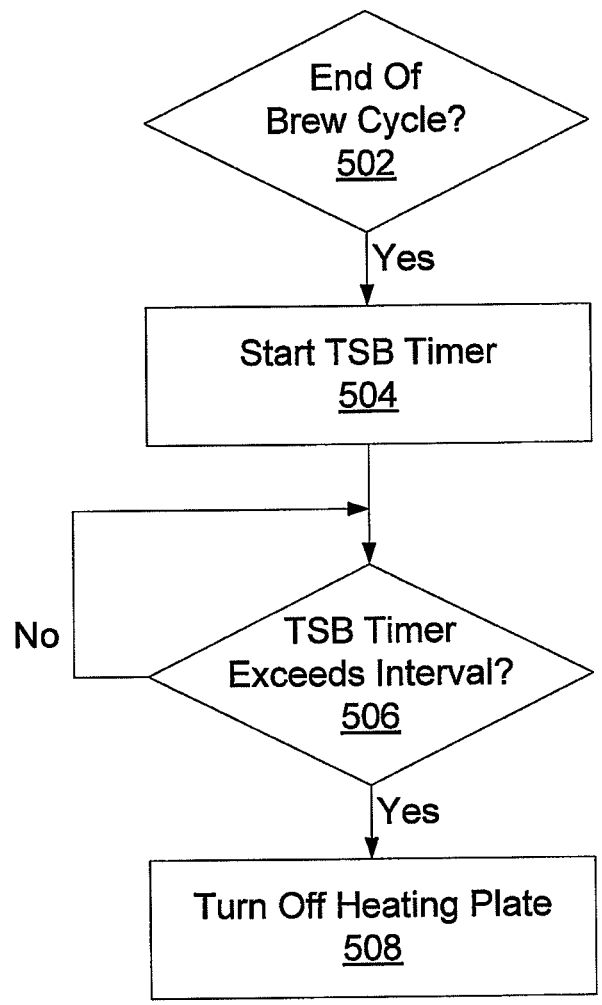
FIGS. 19-21 illustrate process flows illustrating methods of operation of a beverage maker in accordance with non-limiting embodiments.

FIG. 19 illustrates a process flow illustrating a method of operating a time since brew timer in accordance with one non-limiting embodiment. At 502, the control circuit 316 may determine whether there has been a change in the reading from the sensor 314 indicating the end of a brew cycle. If such a signal is received, the control circuit 316 may initiate the TSB timer at 504. At 506, the control circuit 316 may determine whether the current value of the TSB timer exceeds a predetermined interval (e.g., two hours). If the predetermined interval is reached, it may indicate that the beverage is beyond a desirable drinking age. Accordingly, if the predetermined interval is reached, the control circuit 316 may disable the heating plate 313 at 508, allowing any beverage present in the carafe 312 to cool. According to various embodiments, the control circuit 316 may turn off the entire beverage maker 300.

In one embodiment, the control system 303 may be configured to provide a cleaning/maintenance reminder to a user, and to enable user initiation of an automatic cleaning process implemented by the control system 303. In certain embodiments, the beverage maker 300 may comprise a clean indicator (e.g., an LED or other suitable light-emitting device) located on the control panel 320 for providing the cleaning/maintenance reminder. The control system 303 may monitor usage of the beverage maker 300 to control the status of the clean indicator. In certain embodiments and as described below in connection with FIG. 19, for example, the control circuit 316 may monitor usage by tracking the number of brew cycles performed by the beverage maker 300. According to such embodiments, if the number of tracked brew cycles equals a predefined number, the control circuit 316 may activate the clean indicator in order to provide the cleaning/maintenance reminder to the user. In embodiments in which the clean indicator is a light-emitting device, for example, the control circuit 316 may cause the clean indicator to transition from a non-illuminated state to an illuminated state. In this way, a user is reminded to attend to the cleaning and maintenance requirements of the beverage maker 300. Such requirements may include, for example, the need to remove mineral buildup, lime scale deposits, and/or other contaminants that have accumulated within the beverage maker 300 over time, and the need to replace the filter 34 (FIG. 3).

In certain embodiments, the beverage maker 300 may comprise a clean switch accessible from the control panel 320 that may be actuated by a user to initiate the automatic cleaning process. The clean switch may be in the form of a push button switch, for example. In embodiments in which the clean indicator is implemented using a light-emitting device, the clean indicator may be integrally formed with the clean switch. As described below in connection with FIG. 20, the automatic cleaning process may include performing a number of alternating brew cycles to pass a suitable cleaning agent (e.g., a descaling product or a vinegar solution) through the beverage maker 300. Accordingly, prior to initiating the automatic cleaning process, the filter 34 may be removed from the beverage maker 10 by first removing the filter dipstick 32 from the beverage maker 10, and, if necessary, removing the filter 34 from the filter cage 33 of the filter dipstick for disposal.

Figure 20:
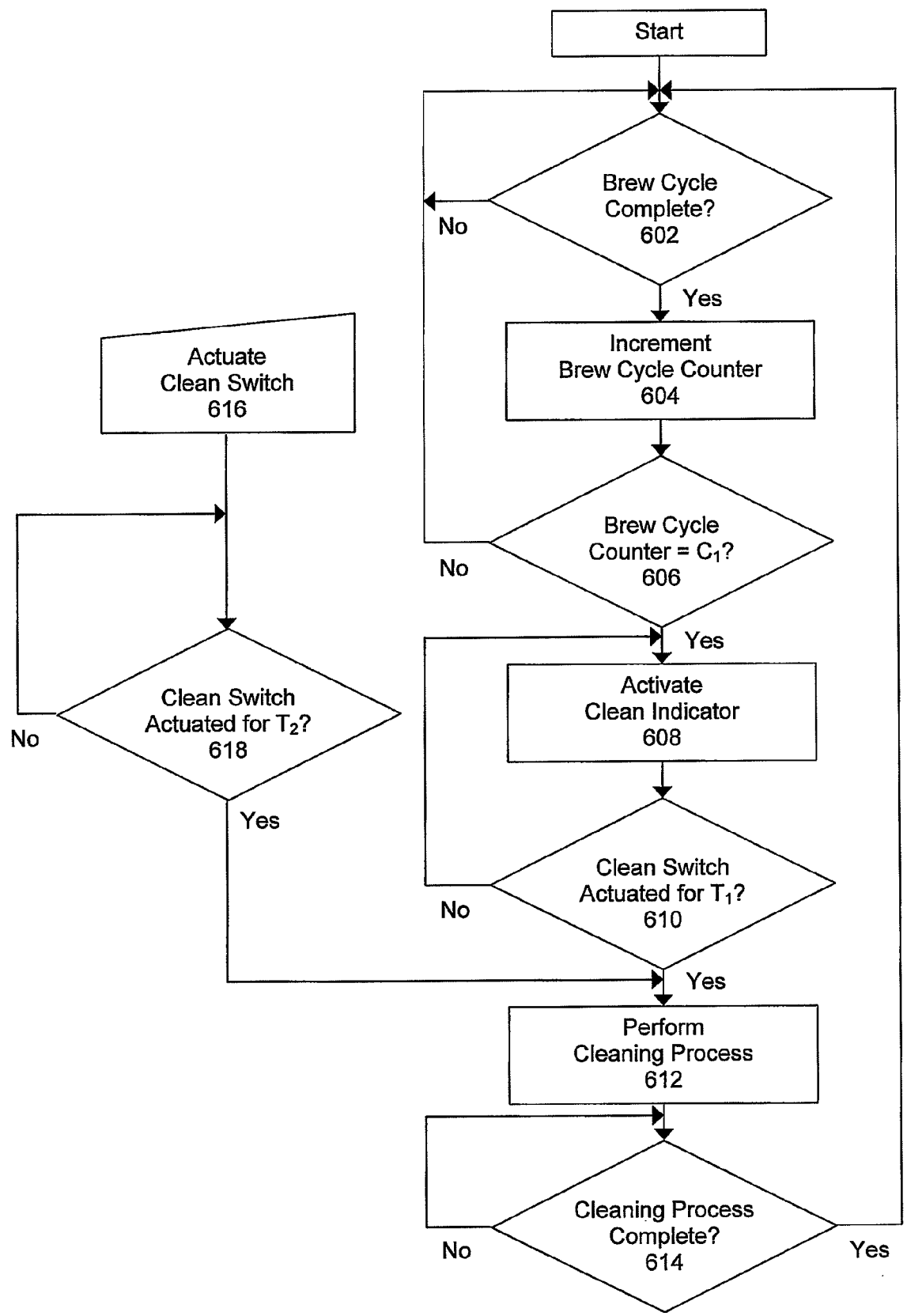

FIG. 20 is a process flow illustrating a method of providing a cleaning/maintenance reminder to a user and enabling user initiation of an automatic cleaning process in accordance with one non-limiting embodiment. At 602, the control circuit 616 may determine whether a brew cycle has ended. In certain embodiments, and as discussed above in connection with FIG. 17, the control circuit 316 may monitor the temperature of the heater 306 via the sensor 314 to make this determination. If the control circuit 316 determines a brew cycle has ended, a brew cycle counter contained within the control circuit 316 is incremented by one count at 604. Otherwise, the process returns to 602.

The value of the brew cycle counter is monitored at 606. If the value of the brew cycle counter is less than a predefined brew cycle count $C_1$, the process returns to 602, and the value of the brew cycle counter will continue to increase as additional brew cycles are performed. If the value of the brew cycle counter is equal to the predefined brew cycle count $C_1$, the control circuit 316 may activate the clean indicator to provide a cleaning/maintenance reminder to the user. According to various embodiments, the predefined brew cycle count $C_1$ is equal to 60, although it will be appreciated that the $C_1$ may generally be any suitable value. In certain embodiments, for example, depending on whether beverage maker 300 is intended for use with hard water and/or beverage products associated with relatively high levels of residue, the value of $C_1$ may be decreased or increased such that clean indicator is activated more or less frequently, respectively, for a given amount of beverage maker use. In certain embodiments, the value of $C_1$ may be based on the type of filter 34 used in the beverage maker 10. For example, if the filter 34 is designed to provide effective filtration for 60 brew cycles, the value of $C_1$ may be selected to be 60.

At 610, the status of the clean switch is monitored. If the clean switch is actuated for a time less than $T_1$, or not actuated at all, the process returns to 608, and the clean indicator remains in the activated state. Generally, time $T_1$ may be selected to prevent inadvertent initiation of the automatic cleaning process (e.g., by accidentally bumping the clean switch). In one embodiment, for example, $T_1$ is 3 seconds. It will be appreciated, however, that $T_1$ may be greater or less than 3 seconds.

If the clean switch is actuated for a time in excess of $T_1$, the process proceeds to 612, and the automatic cleaning process is performed. During at least a portion of the automatic cleaning process, the control circuit 316 may cause the clean indicator to flash (in embodiments in which the clean indicator is a light-emitting device), thus indicating to a user that the automatic cleaning process is in progress. Additionally, in certain embodiments, the control circuit 316 may operate to disable other features of the control panel 320 (with the exception of a power switch for turning the beverage maker 300 off) from being used during the automatic cleaning process. The status of the cleaning process is monitored at 614. Upon completion of the cleaning process, the process returns to 602.

In certain circumstances, it may be necessary or otherwise desirable to initiate the automatic cleaning process before the brew cycle counter is equal to the predefined brew cycle count $C_1$. Accordingly, in certain embodiments and as shown at 616 of FIG. 20, the clean switch may be actuated to initiate an automatic cleaning process when the clean indicator is not activated. If the clean switch is actuated for a time in excess of $T_2$, as determined at 618, the process proceeds to 612, and the automatic cleaning process is performed. In one embodiment, the value of $T_2$ may be equal to that of $T_1$. In another embodiment, the value of $T_2$ may be different than that of $T_1$.

Figure 21:
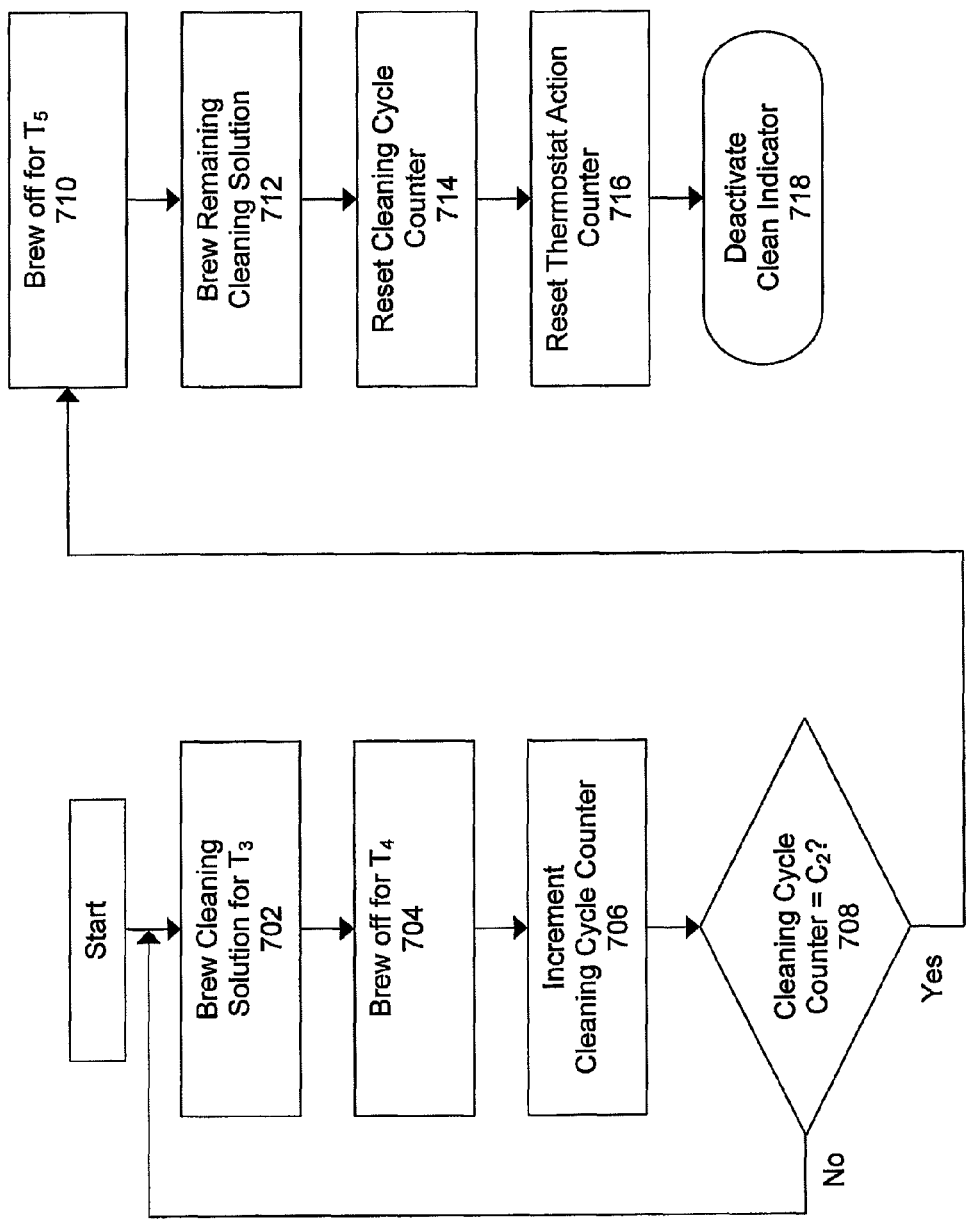

FIG. 21 is a process flow illustrating a method of performing the cleaning process of 612 (FIG. 19) in accordance with one non-limiting embodiment. In certain embodiments and as discussed above, prior to initiation of the cleaning process, the filter 34 has been removed from the filter dipstick 32, and a suitable amount of cleaning agent has been poured into the reservoir 304.

At 702, the control circuit 316 may initiate a brewing cycle such that cleaning agent present at the heater 306 is boiled to force cleaning agent up to the shower 308 and into the carafe 310. The brewing process may be performed for a time $T_3$, after which the brewing process is turned off by the control circuit 316 for a time $T_4$ at 704. Next, at 706, a cleaning cycle counter contained within the control circuit 316 is incremented by one count. The value of the cleaning cycle counter is monitored at 708. If the value of the cleaning cycle counter is less than a predefined cleaning cycle count $C_2$, the process returns to 702, and the value of the cleaning cycle counter will continue to increase as additional brewing cycles are performed at 702 and 704. When the value of the cleaning cycle counter is equal to the predefined cleaning cycle count $C_2$, the process proceeds to 710, where the brewing process remains off for a time $T_5$. During this time, cleaning agent introduced into the brew system 302 may interact with and loosen mineral deposits and accumulated contaminants. Values of $T_3$, $T_4$, $C_2$, and $T_5$ and may be selected such that cleaning agent is introduced into the brew system 302 in a sufficient amount and for a sufficient time to adequately clean the brew system components, and such that the cleaning process is not unnecessarily long. In certain embodiments, for example, $T_3$ is 7 seconds, $T_4$ is 21 seconds, $C_2$ equals 60, and $T_5$ is 30 minutes. In certain embodiments, the automatic cleaning process may be completed in an hour or less.

From 710, the process proceeds to 712 at which the remainder of the cleaning agent is continuously brewed until the reservoir 304 is emptied. The cleaning cycle counter and the brew cycle counter values are reset to zero at 714 and 716, respectively, and the cleaning process is completed at 718 by deactivating the clean indicator.

Subsequent to completion of the cleaning process at 718, an unused filter 34 may be placed into the filter cage 33 of the filter dipstick 32, and the filter dipstick 32 may then be reinstalled into the beverage maker 10.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A beverage maker, comprising:
   a brew system comprising
   a reservoir to receive a liquid;
   a heater to heat the liquid;
   an expendable filter structured to filter impurities from the liquid for at least a predetermined number of brew cycles;
   a container for receiving a beverage brewed from the filtered liquid;
   an indicator to indicate at least one of a cleaning and a maintenance need of the beverage maker;
   a control circuit comprising a processor, wherein the control circuit is configured to:
   receive a signal from at least one sensor indicative of an end of a brew cycle;
   increment a brew cycle counter by one count at the end of each brew cycle; and
   activate the indicator when a value of the brew cycle counter is equal to the predetermined number of brew cycles; and a clean switch in communication with the control circuit, wherein the clean switch is integrally formed with the indicator and actuatable to initiate an automatic cleaning process.

2. The beverage maker of claim 1, wherein the container comprises a removable carafe.

3. The beverage maker of claim 1, wherein the at least one sensor comprises a solid state sensor.

4. The beverage maker of claim 3, wherein the at least one sensor comprises a thermistor.

5. The beverage maker of claim 1, wherein the at least one sensor is positioned to sense the temperature at the heater.

6. A beverage maker, comprising:
   a brew system comprising
      a reservoir to receive a liquid;
      a heater to heat the liquid;
      an expendable filter structured to filter impurities from the liquid for at least a predetermined number of brew cycles;
   a container for receiving a beverage brewed from the filtered liquid;
   an indicator to indicate at least one of a cleaning and a maintenance need of the beverage maker; and
   a control circuit comprising a processor, wherein the control circuit is configured to:
      receive a signal from at least one sensor indicative of an end of a brew cycle;
      increment a brew cycle counter by one count at the end of each brew cycle;
      activate the indicator when a value of the brew cycle counter is equal to the predetermined number of brew cycles;
      for the predetermined number of cycles, activate the brew system for a first predetermined amount of time to introduce a cleaning agent contained in the reservoir into the beverage maker, and deactivate the brew system for a second predetermined amount of time;
      deactivate the brew system for a third predetermined amount of time; and
      activate the brew system to pass a remaining amount of the cleaning agent contained in the reservoir through the beverage maker.

\* \* \* \* \*